Jan. 17, 1956   R. F. KAYSER, SR   2,731,544
RETRACTIBLE CLEARANCE LIGHT FOR TRUCKS AND THE LIKE
Filed Nov. 2, 1953

Raymond F. Kayser, Sr.
INVENTOR.

BY Clarence A. O'Brien
and Harvey B. Jacobson
Attorneys

United States Patent Office 2,731,544
Patented Jan. 17, 1956

2,731,544
RETRACTIBLE CLEARANCE LIGHT FOR TRUCKS AND THE LIKE

Raymond F. Kayser, Sr., Shreveport, La.

Application November 2, 1953, Serial No. 389,616

3 Claims. (Cl. 240—7.1)

The present invention relates to new and useful improvements in clearance lights for trucks and other vehicles and more particularly to an automatically retractible light to prevent damage to the light upon impact therewith.

An important object of the invention is to provide a light support which is mounted in a recess in the truck body and equipped with spring means to normally hold the light in a projected position and retracted into a protected position upon impact of the lens with an object or as the result of a collision.

Another object is to provide a retractible light of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
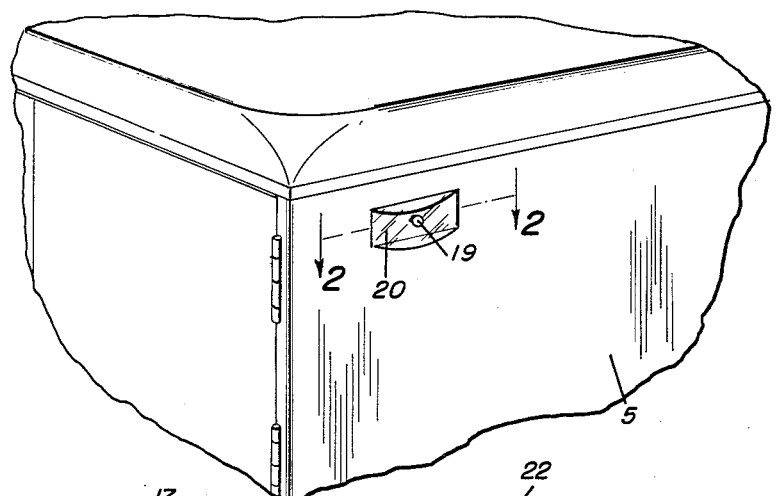
Figure 1 is a perspective view.
Figure 2:
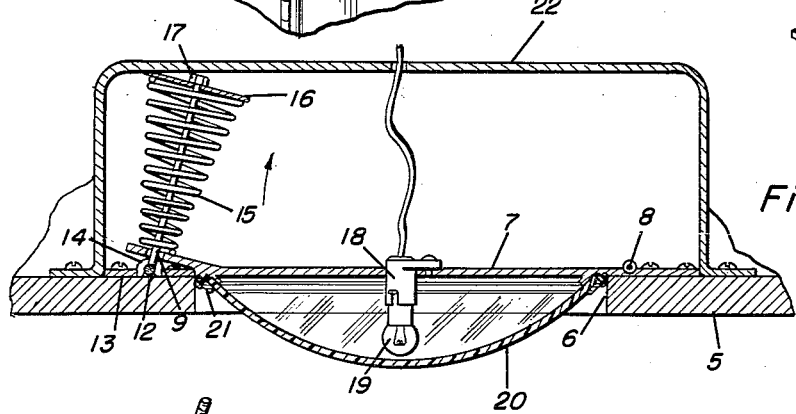
Figure 2 is an enlarged sectional view taken on a line 2—2 of Figure 1.

Referring now to the drawings in detail, wherein for the purpose of illustration I have disclosed a preferred embodiment of my invention, the numeral 5 designates a truck body having an opening 6 in the side thereof. A lamp mounting plate 7 is attached at one edge to the inside of the truck body by a conventional type of hinge structure 8 in the region of the opening to swing inwardly behind the opening.

The free end of the plate 7 is formed with an opening 9 for sliding on a T-shaped rod 10 which includes a cross bar 11 at one end of the rod swivelly mounted in a groove 12 at the rear surface of an attaching plate 13 which is secured to inside of the truck body. The rod 10 projects through a slot 14 which extends transversely of the groove to permit rocking movement of the rod.

A coil spring 15 is mounted on the rod with one end engaged behind the plate 7 and held under tension by a washer 16 and nut 17 threaded on the rod behind the other end of the spring to adjust the tension thereof. The spring yieldably holds the plate 7 against the inside of the truck body behind the opening 6.

A lamp socket 18 is attached at the front of the plate 7 to support a lamp 19 in a forwardly projecting position in the opening 6 of the truck body and a substantially concavo-convex lens 20 is attached in a frame 21 at the front surface of the plate to cover and enclose the lamp. The lamp and lens project outwardly beyond the outer surface of the truck body to effectively illuminate the side of the truck.

A housing 22 is attached to the inside of the truck body to enclose the rear of plate 7, rod 10 and spring 15.

Figure 4:
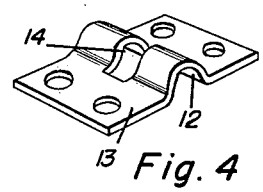
Figure 4 is an enlarged perspective view of the attaching plate for the swivel rod.
Figure 3:
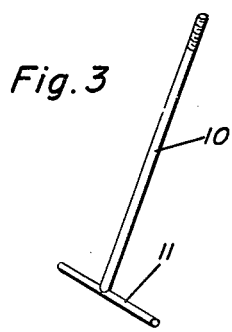
Figure 3 is an enlarged perspective view of the swivel connector for the lamp mounting.

In the modified construction illustrated in Figure 4, the lamp mounting plate is shown at 23 and is hingedly attached at one edge by the hinge structure 24 behind the opening 25 in the truck body 26. The free end of the plate is also slidable on a swivelly mounted T-shaped rod 27, as heretofore described. A substantially U-shaped wire spring 28 is positioned behind the plate 23 and is formed at its central portion with a spring coil 29 from which a pair of arms 30 and 31 extend and which are formed with eyes 32 and 33 respectively at their end portions and are slidable on the rod 27. The arms are tensionally adjusted by a washer 34 and nut 35 attached to the rod to hold the plate at the rear of the opening. A lamp 36 is supported at the front of the plate in an outwardly projecting position in the opening 25 and a lens 37 is attached to the plate for enclosing the lamp.

Figure 5:
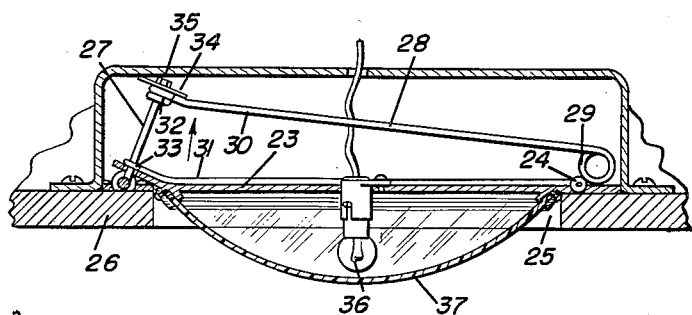
Figure 5 is a sectional view of a modified spring construction.
Figure 6:
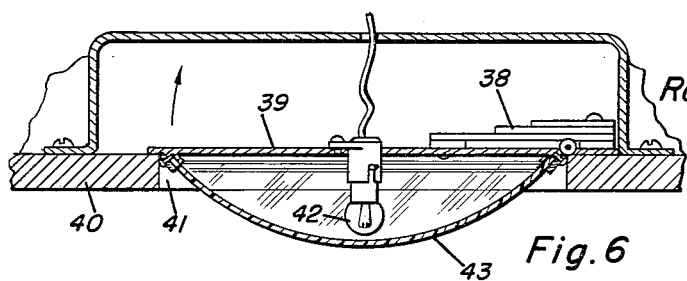
Figure 6 is a similar view of a further modification.

In Figure 5 a leaf spring 38 engages the rear of the plate 39 at the hinged edge of the latter to hold the plate against the inside of the truck body 40 behind the opening 41 therein, and a lamp 42 and lens 43 are also mounted at the front of the plate in a manner as heretofore described.

The spring means provided in each form of the invention holds the mounting plate for the lamp and lens against the inside of the truck body to maintain the lamp and lens in an outwardly projected position and should an object strike the lens the impact thereof will push the lens inwardly and cause the mounting plate to swing rearwardly to retract the lamp and lens in the opening in a protected position to thus reduce the force of the impact and prevent damage thereto.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A clearance lamp for vehicle bodies comprising a lamp mounting, means pivotally attaching the mounting at the inside of the body in the region of an opening therein for swinging inwardly behind the opening, a lamp carried at the front of the mounting, a lens for the lamp carried by the mounting and projecting outwardly through the opening in the path of an object impacting the body to retract the lamp and lens, a relatively stationary rod on which the mounting is slidable, and spring means supported by the rod behind the mounting and opposing lens retracting movement thereof.

2. A clearance lamp for vehicle bodies comprising a lamp mounting, means pivotally attaching the mounting at the inside of the body in the region of an opening therein for swinging inwardly behind the opening, a lamp carried at the front of the mounting, a lens for the lamp carried by the mounting and projecting outwardly through the opening in the path of an object impacting the body to retract the lamp and lens, a rod on which the mounting is slidable, means pivotally attaching the rod to the inside of the body, and spring means supported by the rod behind the mounting and opposing lens retracting movement thereof.

3. A clearance lamp for vehicle bodies comprising a lamp mounting, means pivotally attaching the mounting at the inside of the body in the region of an opening therein for swinging inwardly behind the opening, a lamp carried at the front of the mounting, a lens for the lamp carried by the mounting and projecting outwardly through the opening in the path of an object impacting the body to retract the lamp and lens, a relatively stationary rod on which the mounting is slidable, and a coil spring mounted on the rod behind the mounting and opposing lens retracting movement thereof.

References Cited in the file of this patent

UNITED STATES PATENTS

| | | |
|---|---|---|
| 1,761,345 | Isackson | June 3, 1950 |
| 2,571,130 | Hargis | Oct. 16, 1951 |